Jan. 21, 1969    H. L. BAKER    3,423,012
CENTRIFUGAL BLOWER WHEEL AND METHOD OF FABRICATING THE SAME
Filed June 28, 1967    Sheet _1_ of 2

INVENTOR.
HAROLD L. BAKER
BY
Meyer, Tilberry & Body
ATTORNEYS.

Jan. 21, 1969  H. L. BAKER  3,423,012
CENTRIFUGAL BLOWER WHEEL AND METHOD OF FABRICATING THE SAME
Filed June 28, 1967  Sheet 2 of 2

INVENTOR.
HAROLD L. BAKER
BY
Meyer, Tilberry & Body
ATTORNEYS.

United States Patent Office 3,423,012
Patented Jan. 21, 1969

3,423,012
CENTRIFUGAL BLOWER WHEEL AND METHOD OF FABRICATING THE SAME
Harold L. Baker, Warrensville Heights, Cuyahoga, Ohio, assignor to Morrison Products, Inc., Cleveland, Ohio, a corporation of Ohio
Filed June 28, 1967, Ser. No. 649,616
U.S. Cl. 230—134      5 Claims
Int. Cl. F04d 29/28; B23p 15/04

ABSTRACT OF THE DISCLOSURE

A centrifugal blower wheel having axially extending, circumferentially spaced blades arranged in the form of a cylinder. Portions of the blade ends are integrally connected to spaced portions of circumferential strips, with the remaining blade end portions being unsupported. T-shaped reinforcing gathers bridge the remaining portions of the strips. The unsupported blade end portions are bent back forming blade-stabilizing lips. Annular, channel-shaped end rings embrace the circumferential strips and crimpingly engage the gathers.

A method of fabricating a centrifugal blower wheel of the type described including the step of applying axial, compressive forces to the assembly while simultaneously crimping both end rings.

---

This invention relates to the centrifugal blower art and more particularly to an improved centrifugal blower wheel.

The present invention is particularly applicable to centrifugal blower wheels formed from stamped metal parts, and it will be described with particular reference thereto; however, it will be appreciated that the invention has broader aspects and may be applicable to blower wheels made from other materials formed in different ways, such as molded plastic.

Advances in the construction of blower wheels have resulted in the development of a simplified blade assembly which can be stamped from a continuous sheet of metal. Through appropriate shaping, bending, and assembling steps, there is formed a cylindrical wheel having circumferentially spaced blades. Representative of this established practice are the teachings of U.S. Patent 2,242,586.

In developing this type of blower wheel, emphasis has been placed on using the thinnest possible sheet metal commensurate with the strength requirements needed to maintain the structural integrity of the wheel in operation. This reduces the raw material cost and the weight of the blower wheel. In many applications, a suitable balance between sheet metal thickness and the structural integrity of the blower wheel have been achieved without difficulty. There is, however, a need for lighter weight blower wheels and blower wheels of greater structural integrity for conventional applications. In addition, there is a need for lightweight blower wheels, and blower wheels of high structural integrity and of greater accuracy and trueness (in terms of concentricity and parallelism) for applications requiring extremely large wheels and/or operation at unusually high rotational velocities. The present invention fills these needs by providing a centrifugal blower wheel of improved construction, having a higher strength to weight ratio and greater trueness and accuracy than heretofore thought possible.

In accordance with one aspect of the present invention, there is provided a centrifugal blower wheel comprised of a plurality of axially extending, circumferentially spaced blades arranged in the form of a cylinder; a pair of circumferentially extending strips, one adjacent one end of the blades and the other adjacent the other end of the blades; a web integrally connecting an end of each blade with spaced portions of the adjacent strip; each of the blades having a leading edge and a trailing edge and an arcuate axial cross-section with a convex surface facing outwardly and a concave surface facing inwardly of the cylinder; each of the webs extending generally circumferentially of the cylinder from a point about midway between the leading and trailing edges of a blade, forwardly to a point spaced from the leading edge of the blade, leaving a circumferential section of unsupported blade ends between two adjacent spaced blades extending from a point about midway between the leading and trailing edges of one blade, rearwardly, to a point spaced from the leading edge of the adjacent blade; the remaining portions of each of the strips, i.e., those portions disposed between the spaced portions thereof integrally connected to the blade ends by the webs, each having formed therein a generally T-shaped gather with the crosspiece of the T extending longitudinally of the strip and bridging the circumferential section of unsupported blade ends between two adjacent spaced blades.

In accordance with another aspect of the present invention, there is provided a centrifugal blower wheel of the type described wherein the unsupported portions of the blade ends, i.e., the portions extending from a point about midway between the leading and trailing edges thereof, rearwardly, to the trailing edge thereof, are curved backwardly and inwardly toward the convex surface of the blade, forming a blade-stabilizing lip.

In accordance with another aspect of the present invention there is provided an improved method of fabricating a centrifugal blower wheel of the type described wherein the circumferentially extending strips are embraced with end rings, and the assembly is subjected to axial, compressive forces, while simultaneously, both the end rings are crimped in place.

Centrifugal blower wheels formed in accordance with the teachings of the present invention have greater structural integrity than blower wheels formed from the same thickness of sheet metal in accordance with the prior art practices. Moreover, centrifugal blower wheels formed in accordance with the teachings of the present invention can be made from sheet metal which is thinner than that used by the prior art, yet the structural integrity of the resulting centrifugal blower wheel will be comparable to that made in accordance with prior art practices from thicker sheet metal. Further, larger blowers, and blowers designed to operate at unusually high rotating velocities, can be satisfactorily manufactured in accordance with the teachings of the present invention.

Centrifugal blower wheels which have inadequate structural integrity, tend to be noisy in operation and vibrate excessively. This is believed to be due to the fact that the blades are not sufficiently rigid to withstand the forces of the air rushing by. Consequently, the blades tend to oscillate back and forth about their longitudinal axes, i.e., flutter, in an effort to orient themselves to offer less resistance to the air. This in turn sets up eddy currents which introduce noise, vibration and less efficient blower operation. Centrifugal blower wheels produced in accordance with the present invention have blades which are unusually rigid and capable of resisting flutter even under extreme operating conditions.

Therefore, it is an object of the present invention to provide a centrifugal blower wheel of improved construction.

A further object of the invention is to provide a centrifugal blower wheel which overcomes certain disadvantages of the prior art.

Another object of the invention is to provide a centrifugal blower wheel having greater structural integrity for a given thickness of sheet metal, than heretofore thought possible.

Yet another object of the invention is to provide a centrifugal blower wheel having satisfactory structural integrity when made from sheet metal having a thickness less than that considered usable by the prior art.

A still further object of the invention is to provide a centrifugal blower wheel of greater trueness and accuracy.

These and other objects and advantages will become apparent from the following detailed description of a preferred embodiment of the invention when read in connection with the accompanying drawings, in which.

Figure 1:
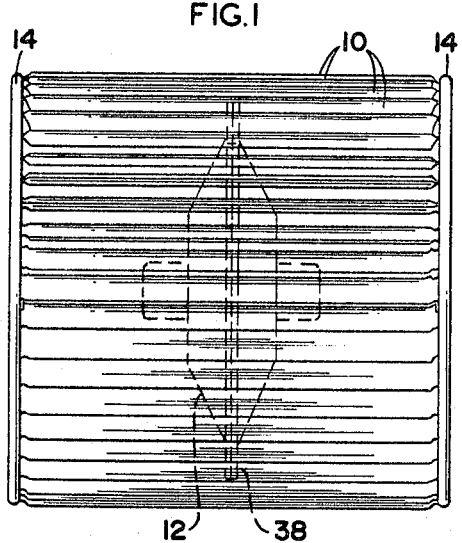
FIGURE 1 is a schematic pictorial view of a preferred embodiment showing the general arrangement of parts.
Figure 2:
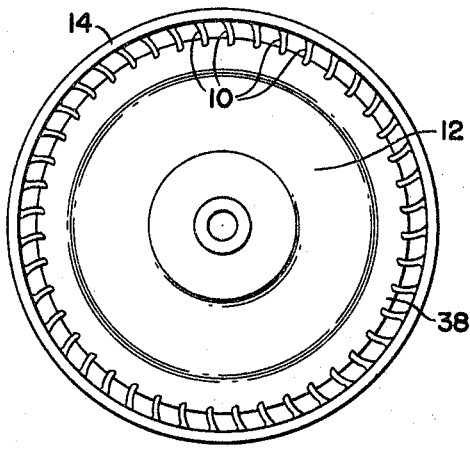
FIGURE 2 is a schematic end view of the embodiment shown in FIGURE 1.

Referring now to the drawings wherein the showings are for purposes of illustrating preferred embodiments of the invention only and not for the purpose of limiting the same, FIGURES 1 and 2 show a centrifugal blower wheel comprising a plurality of integrally connected, axially extending, circumferentially spaced blades 10, arranged in the form of a cylinder, a hub 12, and a pair of annular channel-shaped end rings 14.

Figure 3:
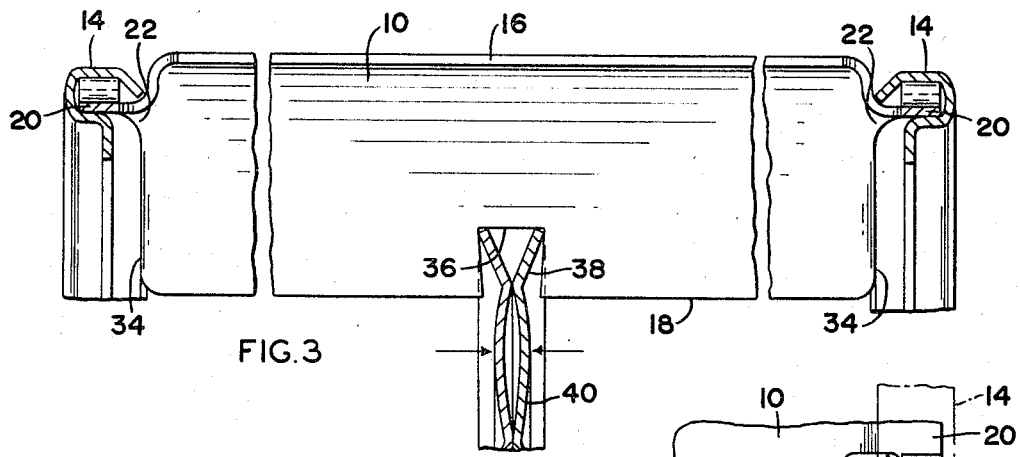
FIGURE 3 is a greatly enlarged, fragmentary, schematic view showing the mounting of a single blade.
Figure 5:
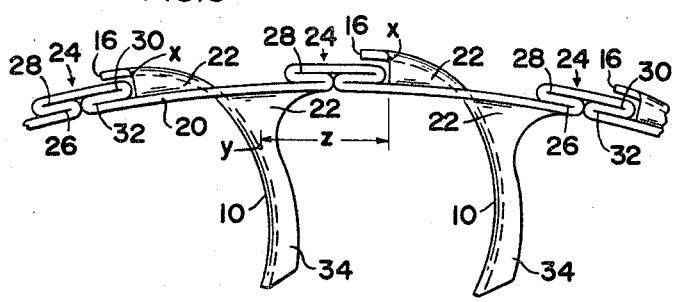
FIGURE 5 is a greatly enlarged, fragmentary, schematic end view showing the blade end construction.
Figure 4:
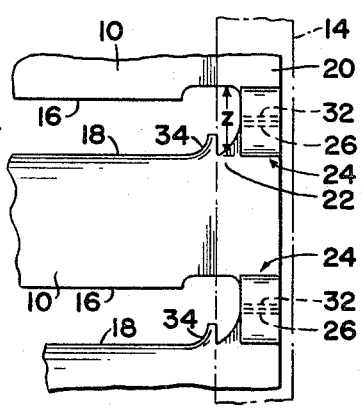
FIGURE 4 is a greatly enlarged, fragmentary, schematic plan view showing the blade end construction.

As best seen in FIGURES 3 and 5, each of the blades has a leading edge 16, a trailing edge 18, and an arcuate, axial cross-section with a convex surface facing outwardly and a concave surface facing inwardly of cylinder formed by the arrangement of blades.

The centrifugal blower wheel further comprises a pair of circumferentially extending strips 20, and a web 22 integrally connecting an end of each blade with spaced portions of the adjacent strip 20. Webs 22 extend generally circumferentially of the cylinder from a point (marked with the letter y in FIGURE 5) about midway between leading and trailing edges 16, 18, of a blade 10 forwardly to a point (marked with the letter x in FIGURE 5) spaced from the leading edge 16 of a blade 10. This leaves a circumferential section of unsupported blade ends (marked with the letter z in FIGURE 5) between two adjacent spaced blades, extending from a point about midway between leading and trailing edges 16, 18, of one blade, rearwardly to a point spaced from the leading edge 16 of the adjacent blade.

The remaining portions of strip 20 (corresponding to the distance z) i.e., those portions disposed between the spaced portions (the distance from x to y) integrally connected to the ends of blades 10 by webs 22, each have formed therein a generally T-shaped gather designated generally as 24, with the crosspiece of the T extending longitudinally of strip 20 and bridging the circumferential section of unsupported blade ends (corresponding to the distance z) between two adjacent spaced blades 10.

As best seen in FIGURE 5, each of T-shaped gathers 24 consists of a single-continuous length of strip 20, formed with first 180° bend defining a first fold 26, a second 180° bend in the opposite direction of the first bend, and defining a second fold 28, a third 180° bend in the same direction as the first bend and defining a third fold 30, and a fourth 180° bend in the same direction as the second bend, and defining a fourth fold 32. The section of strip 20 extending between second and third fold 28, 30, characterizes the crosspiece of the T, and the first and fourth folds 26, 32, abut in the same horizontal plane, characterizing the stem of the T.

This arrangement provides a three layer section of strip 20 as structural reinforcement where it is needed the most, i.e., along those portions of the strip bridging the interconnections of blades 10 with strip 20. When a length of integrally connected blades 10 are shaped to form a cylinder, abutting folds 26, 30 are brought under compression further improving the structural integrity of the resulting blower wheel.

In accordance with another aspect of the invention the unsupported portions of the ends of blades 10, i.e., the portions extending from a point about midway between the leading and trailing edges of blade (indicated as y in FIGURE 5) rearwardly, to the trailing edge 18 of the blade 10, are curved backwardly and inwardly toward the convex surface of the blade, forming a blade-stabilizing lip 34. Blade-stabilizing lips 34 tend to place the concave surface of the blade under tension and the convex surface of the blade under compression, thereby increasing the structural integrity of the blade and improving its ability to resist distortion and flutter, when rotating at high velocities.

Figure 6:
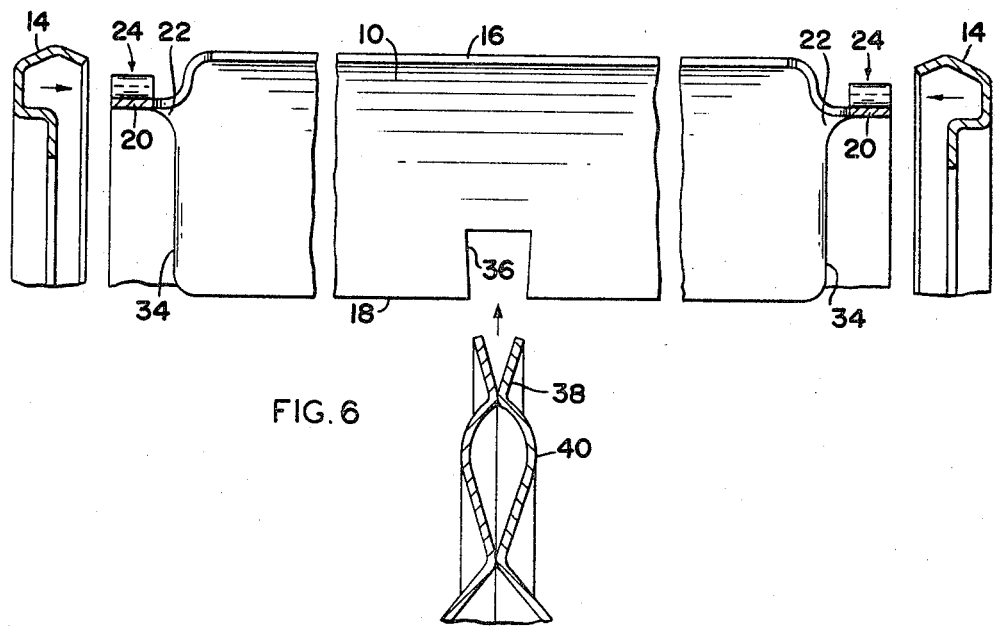
FIGURE 6 is a fragmentary, exploded, schematic view of the blower parts prior to assembly.

As best seen in FIGURES 3 and 6, trailing edge 18 of blade 10 is provided with a notch 36, and collectively, these notches form a peripheral channel interiorly of the cylinder formed by the arrangement of blades. Notches 36 are adapted to receive a portion of a bifurcated clamping means 38 positioned on the periphery of hub 12. In fabrication of the centrifugal blower wheel; a length of integrally connected blades 10 are wrapped around hub 12, with bifurcated clamping means 38 positioned in the peripheral channel formed by notches 36. The bulbous portion 40 of bifurcated clamping means 38 is compressed as shown by the arrows in FIGURE 3, forcing the two arms of bifurcated clamping means 38 into frictional engagement with the edges of notch 36. Thereafter, annular, channel-shaped end rings 14 are placed over the ends of the cylindrical blower wheel so as to embrace circumferentially extending strips 20 and T-shaped gathers 24. End rings 14 are then crimped so as to frictionally engage T-shaped gathers 24 only, thereby adding two additional thicknesses of metal to the sections of strips 20 requiring a greatest reinforcement i.e., those sections disposed between the spaced portions of strip 20 integrally connected to blade ends 10 by webs 22.

Figure 7:
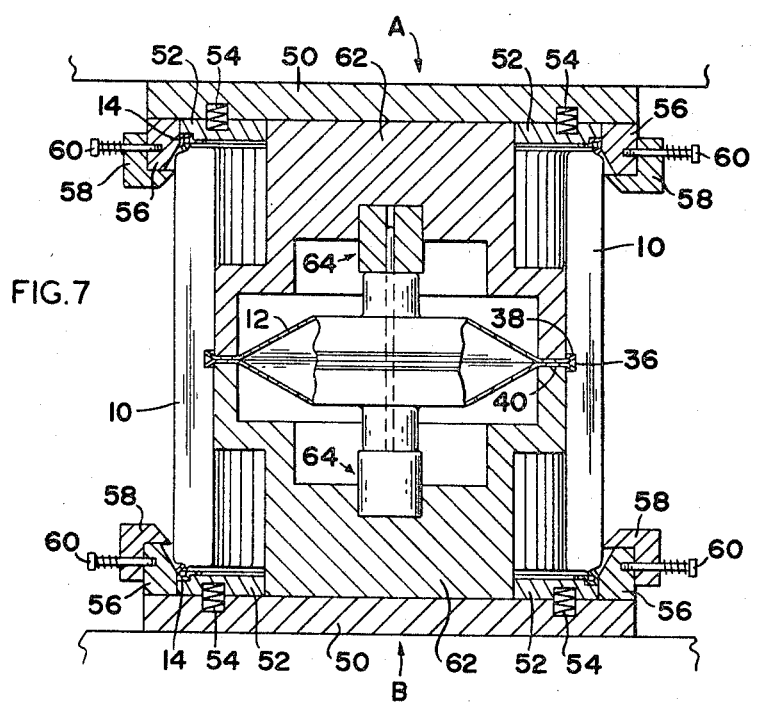
FIGURE 7 is a schematic, section view of a blower wheel mounted in a die assembly during fabrication.

FIGURE 7 illustrates a preferred embodiment of die assembly useful in fabricating a centrifugal blower wheel in accordance with the method of the present invention. The assembly comprises a pair of matched die members, designated generally as A and B, at least one of which is reciprocable toward and away from the other, by drive means not shown, along a path parallel to the axis of hub 12.

Each die member A, B is comprised of a base 50, a pair of end ring supports 52 resiliently mounted thereon through springs 54, a pair of end ring crimping dies 56 to which blade guides 58 are resiliently and adjustably mounted by spring-loaded bolts 60, and hub engaging dies 62. Completing the assembly is pilot pin guide means, designated generally as 64 for aligning the die members A, B.

In using the assembly to fabricate a centrifugal blower wheel in accordance with the procedure described above, die members A, B are brought toward each other whereupon the leading edges of hub engaging dies 62 compress bulbous portion 40 of bifurcated clamping means 38, forcing the branches of the latter to spread apart and frictionally engage the edges of notches 36 in blades 10.

Further movement of die members A, B toward each other causes end ring crimping dies to act on end rings 14, while simultaneously, end ring supports 52 place the entire blower wheel assembly under axial compressive forces. This insures that the assembled wheel will be accurate and true in terms of its concentricity and parallelism, when die members A, B are separated.

While the preferred embodiment of the centrifugal blower wheel described and illustrated is shown with a center mounted hub, it will be appreciated that the advantages of the present construction will also obtain where other mounting arrangements, such as an end mounting, are used.

The present invention has been described in conjunction with certain structural embodiments; however, it is to be appreciated that various structural changes may be made in the illustrated embodiments without departing from the intended scope and spirit of the present invention as defined in the appended claims.

Having thus described my invention, I claim:

1. A centrifugal blower wheel comprised of a plurality of axially extending, circumferentially spaced blades arranged in the form of a cylinder; a pair of circumferentially extending strips, one adjacent one end of the blades and the other adjacent the other end of the blades; a web integrally connecting an end of each blade with spaced portions of the adjacent strip; each of said blades having a leading edge and a trailing edge, and an arcuate axial cross-section with a convex surface facing outwardly and a concave surface facing inwardly of said cylinder; each of said webs extending generally circumferentially of said cylinder from a point about midway between the leading and trailing edges of a blade, forwardly to a point spaced from the leading edge of said blade, leaving a circumferential section of unsupported blade ends between two adjacent spaced blades extending from a point about midway between the leading and trailing edges of one blade, rearwardly, to a point spaced from the leading edge of the adjacent blade; the remaining portions of each of said strips, i.e., those portions disposed between said spaced portions integrally connected to the blade ends by said webs, each having formed therein a generally T-shaped gather with the crosspiece of the T extending longitudinally of said strip and bridging said circumferential section of unsupported blade ends between two adjacent spaced blades.

2. The centrifugal blower wheel as defined in claim 1, wherein each of said T-shaped gathers consists of a single, continuous length of said strip formed with a first 180° bend defining a first fold, a second 180° bend in the opposite direction of said first bend and defining a second fold, a third 180° bend in the same direction as said first bend and defining a third fold, and a fourth 180° bend in the same direction as said second bend and defining a fourth fold, whereby the section of said strip extending between the second and third folds characterizes the crosspiece of the T and the first and fourth folds abut in the same horizontal plane, characterizing the stem of the T.

3. The centrifugal blower wheel as defined in claim 1, wherein the unsupported portions of the blade ends, i.e., the portions extending from a point about midway between the leading and trailing edges thereof, rearwardly to the trailing edge thereof, are curved backwardly and inwardly toward the convex surface of said blade, forming a blade-stabilizing lip.

4. The centrifugal blower wheel as defined in claim 1, further comprising a pair of annular, channel-shaped end rings, one embracing each of said pair of circumferentially extending strips and engaging each of said T-shaped gathers.

5. The centrifugal blower wheel as defined in claim 4, wherein the trailing edge of each of said blades is provided with a notch whereby said cylinder is provided interiorly thereof with a peripheral channel defined by said notches; said blower wheel further comprising a hub having on its periphery, circumferentially extending bifurcated clamping means, at least a portion of which is secured in said peripheral channel by engagement with said notches.

References Cited

UNITED STATES PATENTS

| 2,272,695 | 2/1942 | Evans | 230—134.5 |
| 2,537,805 | 1/1951 | Wilken | 230—134.5 |
| 3,004,326 | 10/1961 | Merz | 230—134.5 |
| 3,055,578 | 9/1962 | Mayne et al. | 29—156.8 |
| 3,080,105 | 3/1963 | Merz | 230—134.5 |
| 3,095,637 | 7/1963 | Levy | 230—134.5 |
| 3,130,480 | 4/1964 | Merz | 29—156.8 |
| 3,335,482 | 8/1967 | McClatchie | 29—156.8 |

HENRY F. RADUAZO, *Primary Examiner.*

U.S. Cl. X.R.

29—156.8